United States Patent [19]

Henderson et al.

[11] Patent Number: 4,831,522
[45] Date of Patent: May 16, 1989

[54] CIRCUIT AND METHOD FOR PAGE ADDRESSING READ ONLY MEMORY

[75] Inventors: Kenneth J. Henderson, Pittsford; Ajaykumar A. Amin, Henrietta, both of N.Y.

[73] Assignee: Microlytics, Inc., Pittsford, N.Y.

[21] Appl. No.: 14,951

[22] Filed: Feb. 17, 1987

[51] Int. Cl.[4] .............................................. G06F 12/08
[52] U.S. Cl. ................................. 364/200; 364/245.31; 364/254.3
[58] Field of Search ... 364/200 MS File, 900 MS File

[56] References Cited

U.S. PATENT DOCUMENTS

| 3,553,653 | 1/1971 | Krock | 364/200 |
|---|---|---|---|
| 3,737,860 | 6/1973 | Sporer | 364/200 |
| 3,970,999 | 7/1976 | Elward | 364/200 |
| 4,158,227 | 6/1979 | Baxter et al. | 364/200 |
| 4,164,786 | 8/1979 | Gollomp | 364/200 |
| 4,368,515 | 1/1983 | Nielsen . | |
| 4,592,011 | 5/1986 | Mantellina | 364/900 |

OTHER PUBLICATIONS

Intel Corporation, *Intel 1987 Memory Components Handbook*, pp. 4-93-4-107; 4-119-4-131; and 4-149-4-178 (1987).

*Primary Examiner*—Thomas M. Heckler
*Attorney, Agent, or Firm*—Howard S. Robbins

[57] ABSTRACT

A circuit and method for page addressing computer read-only memory (ROM) includes expanded ROM (12 and 13) and an address signal generator (20). Address signal generator (20) includes address line generator (21) for providing sufficient additional binary lines to expanded ROM (12 and 13) for addressing the entire expanded ROM memory space and a decoder circuit (22) for detecting the presence of prechosen addresses on the computer system address bus. The prechosen addresses permit selection of page increments in expanded ROM memory space for addressing over the more limited system address bus received by the original ROM.

3 Claims, 2 Drawing Sheets

CIRCUIT AND METHOD FOR PAGE ADDRESSING READ ONLY MEMORY

TECHNICAL FIELD

The present invention relates generally to a circuit and method for expanding the amount of read only memory (ROM) addressable by a computer. More particularly, the present invention relates to a circuit and method for expanding the amount of addressable ROM without modification of the computer hardware.

BACKGROUND ART

Historically digital computers have been designed with two fundamentally different types of memory: read-only memory (ROM) and read-write memory (called random access memory or RAM). ROM is non-volatile and includes no mechanism for altering data after it is initially stored in its cell array. This makes ROM ideally suited for unchanging operating system and application software. RAM is volatile and thus better suited for storage of data generated during operation. Millions of computers have been manufactured with ROM sufficient only to store at least a portion of its operating system and few dedicated application programs.

In recent years application programs have been developed which could very advantageously be executed from ROM. Many of these application programs require large amounts of RAM to store data, such as word processing, spreadsheet and computer-aided design to name a few. Other of these application programs, additionally or alternatively require large data bases that remain unchanged, such as spelling checkers and thesauri. Storing such programs in ROM would free more RAM for user data. Also, system operating performance would be enhanced because RAM requires reloading each time the computer is powered-up and sometimes has slower access times.

The great desirability and need to provide expanded ROM memory space in existing computers has been recognized. Intel Corporation of Santa Clara, Calif. manufactures a series of so-called Page-Addressed Erasable Programmable ROMs (EPROMs) in several cell array dimensions, such as the Model 27513 and 27011 EPROMs. These integrated circuits are manufactured in packages that are "plug compatible" with non-paged ROMs and permit expansion of a predefined address space (16K bytes, for example) to four times that amount (in the case of the Model 27513) and either 50 times that amount (in the case of the Model 27011).

However, devices such as these have not been widely usable to expand ROM memory space because of hardware modifications that must be made to the computer in order to utilize them. Specifically these Intel EPROMs require that two or three of the binary data bus lines that previously delivered data only out from the ROM be made bidirectional to receive page select data, and the ROM be connected to the write enable line of the system control bus. When the computer desires to access a 16K memory space ("page") other than the default page, it first "writes" the page number to the EPROM over the system data bus, in the same manner as data is written to RAM.

In fact, although these devices are loosely called ROMs, they are a form of reprogrammable non-volatile RAM. Intel has recognized this by correctly characterizing these devices as having two operating modes: "Read" and "Write (Page-select)". Since heretofore at best relatively few computers have been constructed to accommodate such signals in ROM program memory, the basic problem of expanding the addressable ROM memory space remains.

SUMMARY OF THE INVENTION

It is, therefore, an object of the present invention to provide a circuit and method for expanding the amount of ROM addressable by a computer without modification of the computer hardware.

It is another object of the present invention to provide a circuit and method for expanding the amount of ROM addressable by a computer, as above, in which the expanded ROM is plug compatible with the original ROM.

It is still another object of the present invention to provide a circuit and method for expanding the amount of ROM addressable by a computer, as above, which may easily toggle between a portion of the expanded memory currently being addressed and a preselected portion of ROM address space.

It is yet another object of the present invention to provide a circuit and method for expanding the amount of ROM addressable by a computer, as above, in which a dictionary for spell checking or thesaurus may be permanently stored in expanded ROM.

These and other objects and advantages of the present invention over existing prior art forms will become more apparent and fully understood from the following description in conjunction with the accompanying drawings.

In general, a circuit and method embodying the concept of the present invention includes replacing computer ROM having N binary address lines for addressing $2^N$ addresses and receiving N system address lines with an expanded ROM having Y binary address lines for storing information in $2^Y$ addresses, where Y is greater than N. Address signal generator means receives the N system address lines from the computer and provides sufficient additional binary address lines to the expanded ROM for addressing the $2^Y$ addresses. The address signal generator means monitors the N system address lines, and upon detection of prechosen addresses generates the additional binary address signals to access the corresponding portion of expanded memory.

PREFERRED EMBODIMENT FOR CARRYING OUT THE INVENTION

Figure 1:
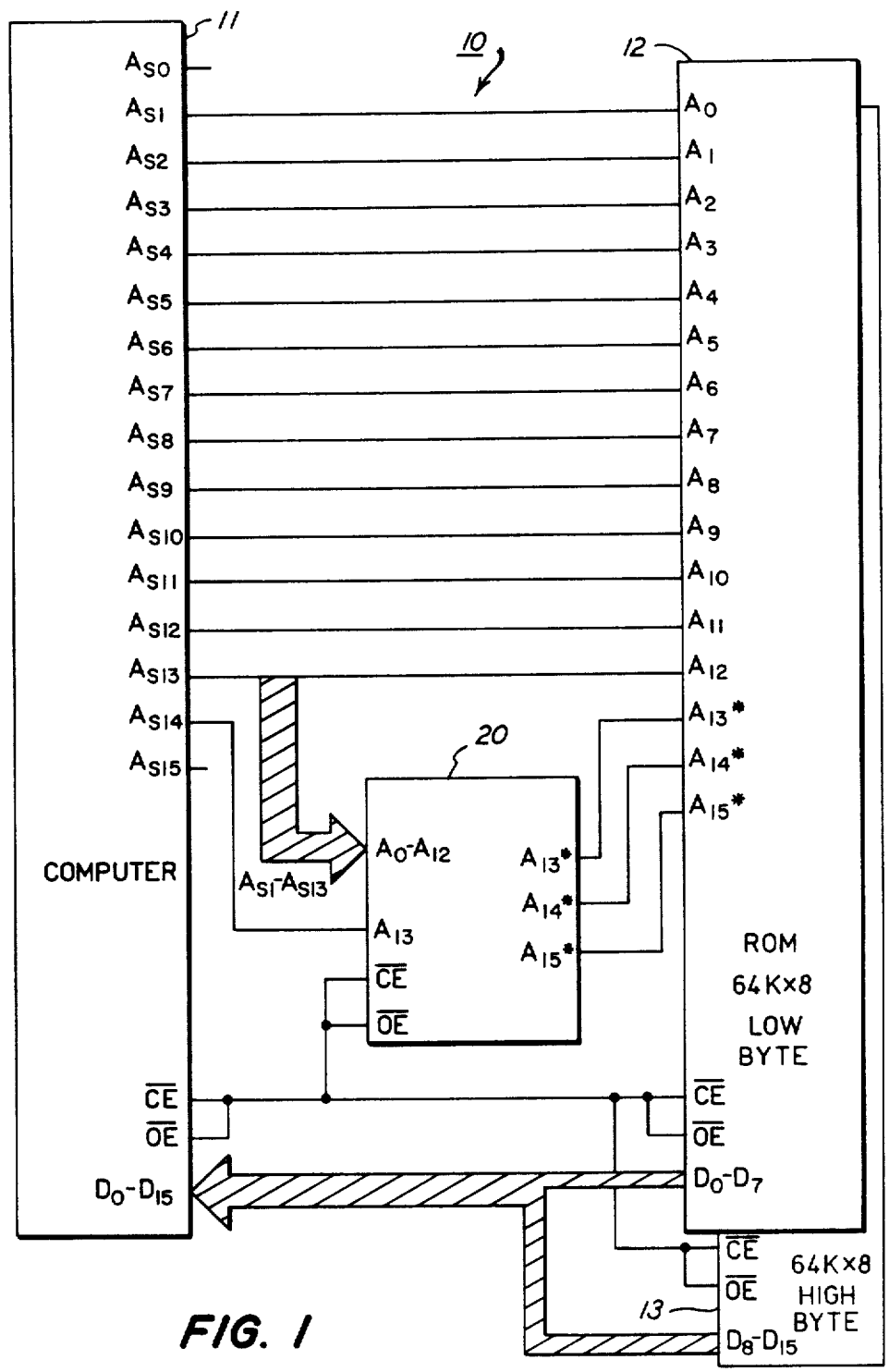
FIG. 1 is a schematic diagram of an exemplary circuit according to the concept of the present invention, and depicts in block form an address signal generator circuit.

FIG. 1 illustrates a circuit, generally indicated by numeral 10, which also embodies a method, for expanding the amount of ROM addressable by computer 11. Strictly for purposes of illustration, circuit 10 is shown configured for operation with a personal computer such as the Model AT manufactured by International Business Machines Corporation (IBM) of Armonk, N.Y. However, the present invention is suitable for operation with any computer having ROM memory, as will be explained further below.

The Model AT Personal Computer employs a Model 80286 microprocessor manufactured by Intel Corporation of Santa Clara, Calif. This microprocessor is designed to utilize words consisting of two 8-bit bytes. 32K words of program memory is contained in two 32K by 8-bit ROM or erasable user-programmable ROM (EPROM) modules, or four 16K by 8-bit ROM/EPROM modules arranged in two 32K by 16-bit arrays. Each 8-bit ROM/EPROM module (hereinafter simply called "ROMs") forms either the most significant (high) byte or least significant (low) byte of the 16-bit word architecture.

As shown in FIG. 1, the memory space occupied by two 16K by 8-bit ROMs in a typical Model AT Personal Computer have been quadrupled to and replaced by two 64K by 8-bit ROMs 12 and 13 such as the Model 27512 EPROM manufactured by Intel Corporation. ROMs 12 and 13 form the low byte and high byte, respectively, in the Model AT Personal Computer's word.

Most of the interconnections between computer 11 and ROMs 12 and 13 are the same as in the Model AT Personal Computer having unexpanded ROM memory. Since the 80286 microprocessor operates on memory in word increments, the least significant system binary address line ($A_{s0}$) is not extended to ROMs 12 and 13. System binary address lines $A_{s1}$ through $A_{s13}$ are recieved by ROMs 12 and 13 as binary address lines $A_0$ through $A_{12}$, respectively. Inverted chip enable ($\overline{CE}$) and inverted output enable ($\overline{OE}$) signals are electrically connected at computer 11, ROM 12 and ROM 13. A unidirectional data bus carries the 8-bit data output from ROM 12 on binary data lines $D_0$ through $D_7$ and the 8-bit data output from ROM 13 on binary data lines $D_8$ through $D_{15}$ to like identified binary data lines in computer 11.

Where, as in the Model AT Personal Computer, 16K physical memory locations are to be addressed, 14 binary address lines are required, and system binary address line $A_{s14}$ is received by ROMs 12 and 13 as binary address line $A_{13}$. However, in circuit 10 the system binary address line for the most significant bit, $A_{s14}$, is received by address signal generator 20 together with system binary address lines $A_{s1}$ through $A_{s13}$, and the inverted chip enable and inverted output enable signals.

Figure 2:
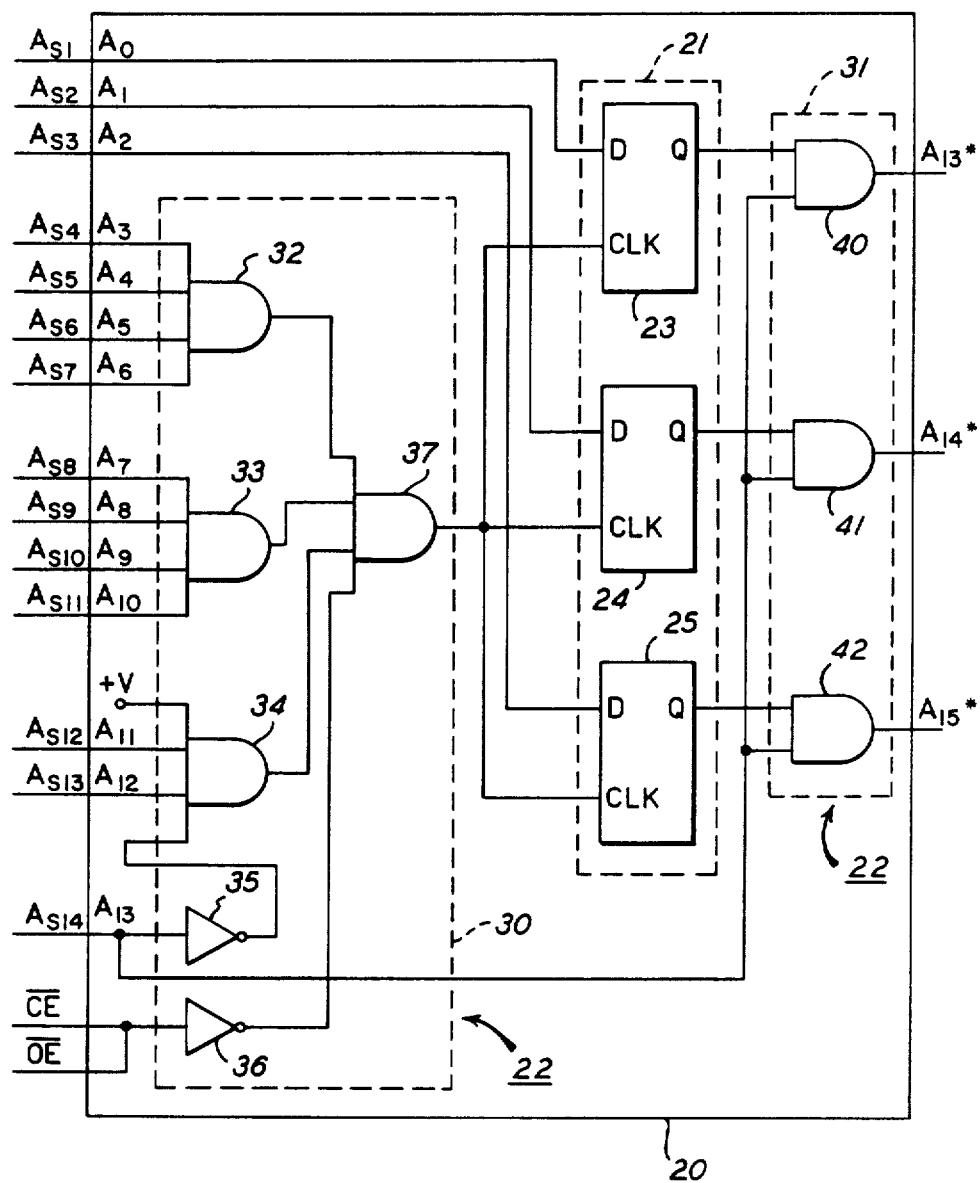
FIG. 2 is a schematic diagram of the address signal generator circuit shown in block form in FIG. 1.

Address signal generator 20, depicted in schematic form in FIG. 2, generates sufficient additional binary address signals on a like number of binary address lines to enable computer 11 to address the expanded 64K of memory space in ROMs 12 and 13. Address signal generator 20 includes address line generator 21 and decoder circuit 22. Address line generator 21 is formed by three delay-type flip-flops 23, 24 and 25 (or other suitable latches) each receiving at its input binary system address lines $A_{s1}$ through $A_{s3}$, respectively, identified within address signal generator 20 as $A_0$ through $A_2$, respectively.

Decoder circuit 22 includes page select decoder 30 and default page selector 31. Page select decoder 30 includes three 4-input AND gates 32, 33 and 34, two inverters 35 and 36, and 4-input AND gate 37. Binary system address lines $A_{s4}$ through $A_{s7}$ and $A_{s8}$ through $A_{s11}$ are respectively received by the inputs to AND gates 32 and 33, identified within address signal generator 20 as $A_3$ through $A_6$ and $A_7$ through $A_{10}$, respectively. Binary system address line $A_{s14}$ is inverted by inverter 35, and (as inverted) received by an input to AND gate 34 along with binary system address lines $A_{s12}$ and $A_{s13}$. (Binary system address lines $A_{s12}$, $A_{s13}$ and $A_{s14}$ are identified within address signal generator 20 as $A_{11}$, $A_{12}$ and $A_{13}$, respectively.) The additional unused input to AND gate 34 may be connected to the +V power supply (holding it to a high or "1" logic level value) or connected to another one of the inputs to AND gate 34.

Inverted chip enable and inverted output enable signals from computer 11 are connected to and inverted by inverter 36. AND gate 37 receives the output signals from AND gates 32, 33 and 34 and inverter 36. The output signal from AND gate 37 is received by the clock inputs to flip-flops 23, 24 and 25.

Default page selector 31 includes three 2-input AND gates 40, 41 and 42. AND gates 40, 41 and 42 receive the Q output signals from flip-flops 23, 24 and 25, respectively, and system binary address line $A_{s14}$. The output signals from AND gates 40, 41 and 42 form the three most significant address signals (called $A_{13^*}$, $A_{14^*}$ and $A_{15^*}$, respectively) required by ROMs 12 and 13 to address the expanded 64K memory space. AND gates 40, 41 and 42 act as a default page selector as explained more fully below. AND gates 40, 41 and 42 also insure that the address signals generated by address signal generator 20 are simultaneously gated to ROMs 12 and 13 irrespective of uneven signal propagation delays arising within address signal generator 20.

Circuit 10 may be and is preferably implemented without any change whatsoever to the hardware configuration of computer 11. Address signal generator 20 may be implemented in an integrated circuit (IC) such as the erasable programmable logic device (EPLD) Model 5C090 from Intel Corporation, and expanded ROMs 12 and 13 selected with the same number of pins as the original ROMs, 28 in the Model AT Personal Computer. In this manner the EPLD and expanded ROMs 12 and 13 may be plugged piggyback directly into the 28-pin socket from which the original 16K×8-bit ROMs were removed without modification to the socket or computer 11. Of course, whatever the implementation, the signal propagation time required by address signal generator 20 and the average access time of expanded ROMs 12 and 13 must be compatible with the average access time for the original ROMs, 150ns in the Model AT Personal Computer.

The operation of circuit 10 is straightforward. The skilled artisan will appreciate that the thirteen binary address lines $A_0$ through $A_{12}$ uniquely address an 8K physical memory space. The three additional binary address lines $A_{13}$ through $A_{15}$ provided by address signal generator 20 expands the addressable physical memory space by a factor of $2^3$ for a total of 64K, in eight increments (or pages) of 8K×8-bits each.

Page selection is determined by the output from address lines $A_{13^*}$, $A_{14^*}$ and $A_{15^*}$, which is in turn controlled by system address lines $A_{s1}$, $A_{s2}$ and $A_{s3}$, respectively. Page select decoder 30 detects the presence on the system address bus of any of the prechosen addresses used to identify a page selection. If a page select address is present, page select decoder 30 clocks flip-flops 23, 24 and 25 and enables AND gates 40, 41 and 42, passing the page selection to ROMs 12 and 13 as the three most significant bits in a 16-bit address.

AND Gates 36, 37, and 38 act as a default page selector by maintaining binary address lines $A_{13^*}$ through $A_{15^*}$ at a low or "0" logic level unless the Q output of the corresponding flip-flop 23, 24 or 25 and the binary system address line $A_{s14}$ both are at a high logic level. This permits computer 11 to address the lowest 8K of the ROMs 12 and 13 64K memory space (called Page 0) in the same manner as with unexpanded ROM: the desired physical address is placed on the system address bus together with changing the chip enable and output enable logic levels to ROMs 12 and 13, and computer 11 receives the contents of that physical address back over its data bus.

Selecting any 8K page in ROMs 12 and 13 for addressing is accomplished by simply having computer 11 send a read request to ROMs 12 and 13 over the system address bus to a preselected address defined by decoder circuit 22. As seen in FIG. 2, the current logic level of system address lines $A_{s1}$, $A_{s2}$ and $A_{s3}$ are output from flip-flops 23, 24 and 25 only when those flip-flops are clocked by page select decoder 30. Page select decoder 30 only clocks flip-flops 23, 24 and 25 when the logic level on system address lines $A_{s15}$ through $A_{s0}$ are x011 1111 1111 dddd in binary (x=don't care) and 3FFx in hexadecimal. (BFFx is not decoded since the sixteenth and most significant bit carried on system address line $A_{s15}$ is not necessary to address the original 16K ROM memory space, and therefor is not extended to the sockets for ROMs 12 and 13).

Table 1 indicates the page selected with the sixteen possible values of the least significant digit in 3FFd.

TABLE 1

| System Address (Hex) | 8K Page Selected | Address Lines (Binary) | | | |
|---|---|---|---|---|---|
| | | $A_{s3}$ $A_{15}*$ | $A_{s2}$ $A_{14}*$ | $A_{s1}$ $A_{13}*$ | $A_{s0}$ — |
| 3FFF | 7 | 1 | 1 | 1 | 1 |
| 3FFE | 7 | 1 | 1 | 1 | 0 |
| 3FFD | 6 | 1 | 1 | 0 | 1 |
| 3FFC | 6 | 1 | 1 | 0 | 0 |
| 3FFB | 5 | 1 | 0 | 1 | 1 |
| 3FFA | 5 | 1 | 0 | 1 | 0 |
| 3FF9 | 4 | 1 | 0 | 0 | 1 |
| 3FF8 | 4 | 1 | 0 | 0 | 0 |
| 3FF7 | 3 | 0 | 1 | 1 | 1 |
| 3FF6 | 3 | 0 | 1 | 1 | 0 |
| 3FF5 | 2 | 0 | 1 | 0 | 1 |
| 3FF4 | 2 | 0 | 1 | 0 | 0 |
| 3FF3 | 1 | 0 | 0 | 1 | 1 |
| 3FF2 | 1 | 0 | 0 | 1 | 0 |
| 3FF1 | 0 | 0 | 0 | 0 | 1 |
| 3FF0 | 0 | 0 | 0 | 0 | 0 |

It should now be apparent that for computer 11 to retrieve information stored at any physical address in 64K×8-bit ROMs 12 and 13, it need only first select the 8K page that contains that address by requesting a read at the appropriate system address shown in Table 1, ignore the information placed on the data bus, and then request a read at the physical address whose offset from the page boundary corresponds to the address containing the information sought.

So long as the logic level of system address line $A_{s14}$ remains at a high logic level the output address lines $A_{13}*$, $A_{14}*$ and $A_{15}*$ remain unchanged and the last page selected remains in effect. Toggling the logic level on system address line $A_{s14}$ will cause address signal generator 20 to switch between the last page selected and the default page, here Page 0. The default page may be altered by the modification of the combinational logic within default page selector 31 such that when address line $A_{s14}$ is at a low logic level the logic levels on address lines $A_{13}*$, $A_{14}*$ and $A_{15}*$ correspond to the desired default page number.

It should be understood that any addresses may be chosen to use for page selection, provided page select decoder 30 is modified to detect the presence of the chosen addresses. However, it seems most often preferable to select a contiguous block of addresses at the top of the first page, minimizing decoding circuitry and interference with the lowest page memory contents.

In the example set forth herein 8 pages of 8K each were required to access 64K of expanded ROM. 16 bytes were necessary to select the 8 pages because of the 2 byte per word memory arrangement of the Model AT Personal Computer. Addresses 3FF0 through 3FFF were chosen because they occupy the highest 8 word addresses available in the first 8K page.

Of course, no matter what addresses are used for page selection it is still possible to retrieve the memory contents of the addresses used for page selections—the data output to computer 11 immediately following a read need only be accepted by the application and not ignored as is done in the usual page select operation. The application must remember to reset the page (if required) after that read operation.

The present invention in the broadest sense may be utilized to expand any ROM array to any larger ROM array. However, where the application requires expansion of ROM in a preexisting hardware configuration, the expansion in the size of ROM is limited only to the extent the desired expanded ROM array is available in a like size package and with acceptable access times. For example, the Model XT and Model PC (with 256K RAM available on the main computer board) Personal Computers made by IBM incorporate six 28-pin sockets to receive up to six 8K×8-bit ROM modules. ROMs are readily available in 28-pin packages of up to one megabit. Arranged in 8-bit bytes, this means that the 8K×8-bit ROMs in Model XT and PC Personal Computers and the 16K×8-bit and 32K×8-bit ROMs in the Model AT Personal Computer may be easily expanded to at least 128K×8-bit arrays using the circuit and method of the present invention.

Table 2 indicates the characteristics of circuit 10 for several exemplary ROM expansions where the page size is chosen to be one-half the original ROM size. In Table 2 the second number in the two columns captioned "ROM Size" are bits per word, N equals the number of binary address lines connected to the original ROM, and Y equals the total number of binary address lines required to address the chosen expanded ROM memory space.

TABLE 2

| Original ROM Size | N | Expanded | | | | | |
|---|---|---|---|---|---|---|---|
| | | ROM Size | Y | Y − N | # of Generated Lines | # of Pages | Page Size |
| 8K × 8 | 13 | 64K × 8 | 16 | 3 | 4 | 16 | 4K |
| 8K × 16 | 13 | 64K × 16 | 16 | 3 | 4 | 16 | 4K |
| 16K × 8 | 14 | 64K × 8 | 16 | 2 | 3 | 8 | 8K |
| 16K × 16 | 14 | 64K × 16 | 16 | 2 | 3 | 8 | 8K |
| 16K × 8 | 14 | 128K × 8 | 17 | 3 | 4 | 16 | 8K |

TABLE 2-continued

| Original | | Expanded | | | | | |
|---|---|---|---|---|---|---|---|
| ROM Size | N | ROM Size | Y | Y − N | # of Generated Lines | # of Pages | Page Size |
| 32K × 8 | 15 | 128K × 8 | 17 | 2 | 3 | 8 | 16K |
| 8K × 8 | 13 | 128K × 8 | 17 | 4 | 5 | 32 | 4K |

The ordinarily skilled artisan will now appreciate that for any given ROM expansion (where memory contents are to be retrieved on a word-wide basis) it will be necessary to provide a number of additional binary address lines equal to one or more than the difference between the number of binary address lines required to address the expanded ROM (Y) and the number of binary address lines available to address the original ROM (N). Since page sizes have been chosen to be one-half the number of addresses in the original ROM, the necessary number of pages is equal to the number of addresses in the expanded ROM divided by the page size.

Page sizes may be chosen to be any number of addresses in powers of two up to the original ROM size. In the general case the number of generated binary address lines required to address the expanded ROM will be equal to the following:

$$[(Y-N)+((\text{Original ROM Size}/\text{Chosen Page Size})-1)]$$

It should be noted that in describing the construction and operation of the logic elements within circuit 10, the so-called "positive true logic" convention has been adopted. As would be recognized by a skilled artisan, any other circuits employing a similar or different logic convention could be utilized to effect the desired functions, and when so utilized clearly fall within the scope of the present invention.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a circuit constructed and method performed according to the concept of the present invention, and reasonably equivalent thereto, will accomplish the objects of the present invention and otherwise substantially improve the art of expanding the amount of addressable ROM in a computer without the need for hardware modification to the computer.

We claim:

1. A circuit for expanding computer read-only memory having N binary address lines for addressing $2^N$ addresses, the read-only memory receiving N system address lines from the computer, comprising:

expanded read-only memory means for replacing the read-only memory, said expanded read-only memory means having Y binary address lines for storing information in $2^Y$ addresses, where Y is greater than N; and, address signal generator means for receiving the N system address lines from the computer and providing sufficient additional binary address lines to said expanded read-only memory means for addressing said $2^Y$ addresses, wherein said expanded read-only memory means is addressed in page increments and prechosen system addresses select specific pages, and wherein said address signal generator means includes address line generator means for providing said additional binary address lines, said address line generator means receiving the number of system address lines sufficient for selection of the number of said page increments, and decoder means for detecting the presence of said prechosen addresses and which page is selected, said decoder means receiving a plurality of the system address lines, said decoder means including page select decoder means for detecting the presense of said prechosen addresses, said page select decoder means receiving a plurality of the system address lines and generating an output signal indicative of receipt of one of said prechosen addresses, and default page selector means for toggling said additional binary address lines between the current selected page and a default page, said default page selector means receiving the most significant of the N system address lines.

2. A circuit for expanding computer read-only memory, as set forth in claim 1, wherein said address line generator means includes the same number of latches as system address lines received by said address line generator means, each said latch receiving one of the system address lines and said output signal from said page select decoder means and generating an output signal indicative of the logic state of its received system address line each time said output signal from said page select decoder means is received.

3. A circuit for expanding computer read-only memory, as set forth in claim 2, wherein said default page selector means includes the same number of AND gates as the number of said output signals from said address line generator means, each said AND gate receiving one said output signal from said address line generator means and the most significant of the N system address lines.

* * * * *